United States Patent [19]
Shunta

[11] 4,045,036
[45] Aug. 30, 1977

[54] PISTON OIL CONTROL RING

[75] Inventor: Rudolph C. Shunta, Muskegon, Mich.

[73] Assignee: Sealed Power Corporation, Muskegon, Mich.

[21] Appl. No.: 733,132

[22] Filed: Oct. 18, 1976

[51] Int. Cl.² .............................................. F16J 9/06
[52] U.S. Cl. .................................... 277/138; 277/200
[58] Field of Search ............... 277/138, 139, 140, 141, 277/153, 200, 216, 144, 145

[56] References Cited
U.S. PATENT DOCUMENTS

| 2,811,399 | 10/1957 | Mayfield | 277/200 |
| 3,160,419 | 12/1964 | Löhr | 277/141 |
| 3,191,946 | 6/1965 | Hamm | 277/138 |
| 3,326,561 | 6/1967 | Braendel | 277/141 |

FOREIGN PATENT DOCUMENTS 1,275,581   5/1972   United Kingdom ................. 277/216

Primary Examiner—Robert I. Smith
Attorney, Agent, or Firm—Barnes, Kisselle, Raisch & Choate

[57] ABSTRACT

In a composite oil control ring for reciprocating piston internal combustion engines which includes a relatively soft parted cast iron ring and an expander-spring disposed internally of the ring to bias the same into sealing engagement with a cylinder wall, a parted annular insert rail of wear-resistant metal is disposed between the expander and the ring to reduce wear on the ring and to prevent embedment or unitization of the ring and spring. The insert rail is generally V-shaped in radial cross section to provide an enhanced bearing area for sliding between the insert and spring, and to reduce potential blockage by the spring of aligned oil drain ports in the insert and the ring.

9 Claims, 8 Drawing Figures

U.S. Patent  Aug. 30, 1977  Sheet 1 of 2  4,045,036
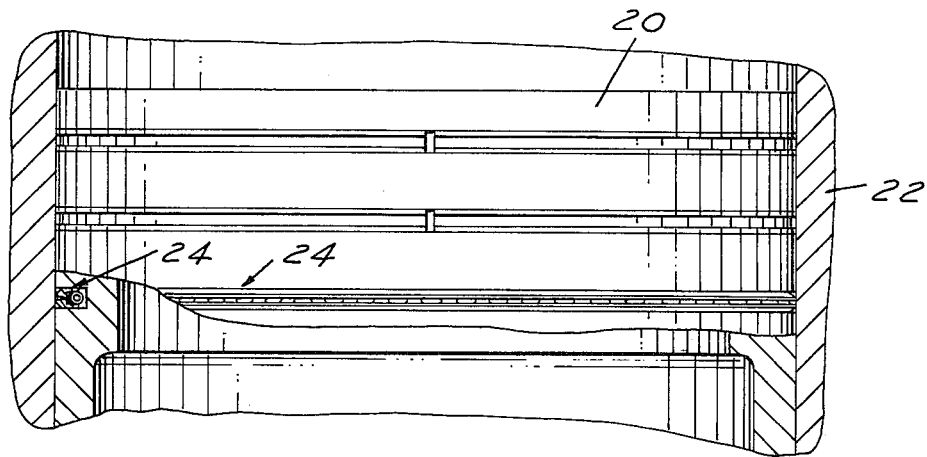
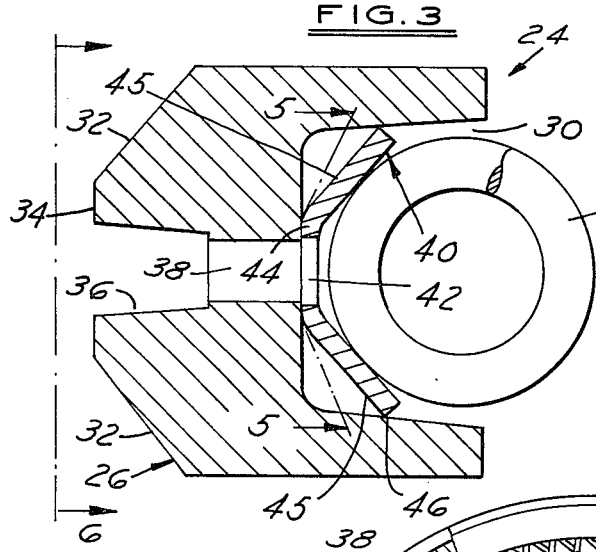
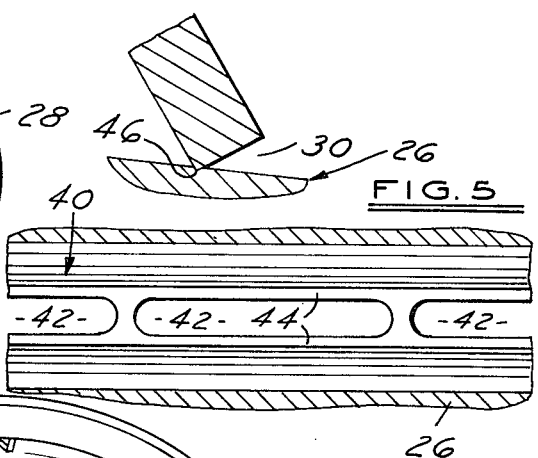
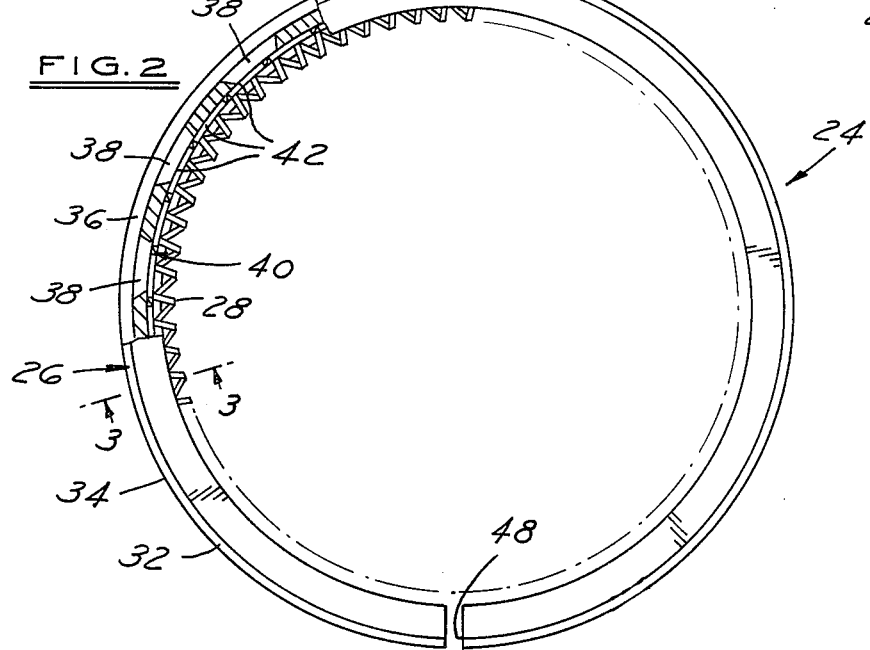

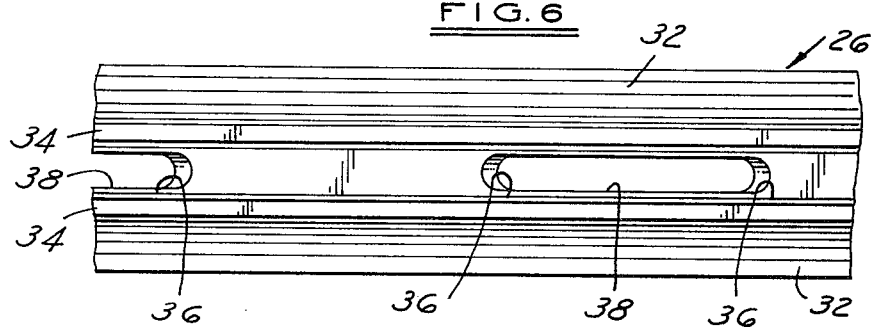
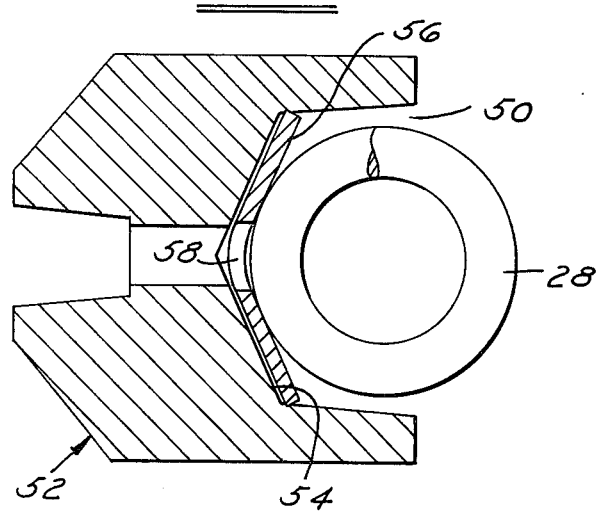
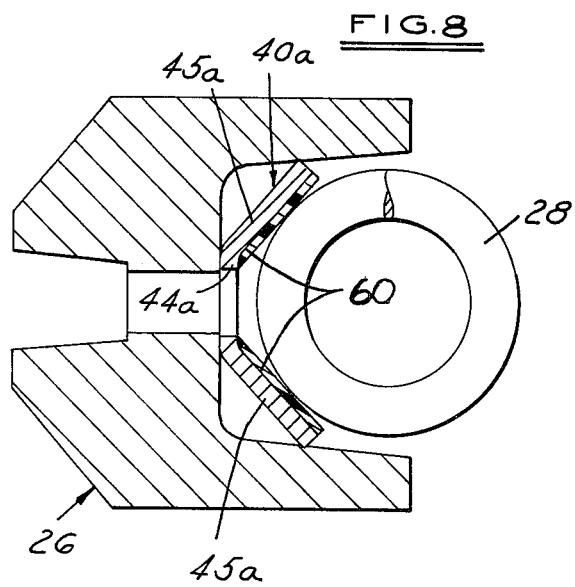

PISTON OIL CONTROL RING

The present invention relates to piston rings, and particularly to composite oil control rings of the type which includes a parted cast iron sealing ring and a ring-expanding spring. More specifically, the invention relates to improvements in the composite oil control ring disclosed in the U.S. application of Edward G. Carlson, Ser. No. 635,580 filed Nov. 28, 1975.

It is an object of the present invention to provide a composite oil control ring of the described type which is economical to manufacture and assemble, which provides increased bearing contact area for sliding contact between the spring and ring to reduce unit loading and increase operating life, and/or which provides improved oil drainage through the ring.

The novel features which are considered to be characteristic of the present invention are set forth in particular in the appended claims. The invention itself, however, together with additional objects, features and advantages thereof, will be best understood from the following description when read in conjunction with the accompanying drawings in which:

FIG. 1 is a fragmentary view of a cylinder and a piston equipped with one embodiment of the composite oil control ring in accordance with the invention, a portion of the piston and ring being broken away to illustrate ring assembly;

FIG. 2 is a plan view, partially broken, showing the composite oil control ring of FIG. 1;

FIG. 3 is a view in radial cross section of the composite ring according to the invention and is taken along the line 3—3 of FIG. 2;

FIG. 4 is an enlarged sectional view of a portion of the ring as shown in FIG. 3;

FIGS. 5 and 6 are sectional views respectively taken along the lines 5—5 and 6—6 of FIG. 3; and FIGS. 7 and 8 are radial cross sectional views of respective alternative embodiments of the invention.

Referring to FIG. 1, a conventional piston 20 is disposed to reciprocate within a cylinder 22 of a gasoline- or diesel-powered internal combustion engine. Piston 20 is provided with the usual peripheral groove in which a composite oil control ring 24 in accordance with the invention is disposed. Referring to FIGS. 2-6 which show in greater detail a preferred embodiment of composite oil control ring 24, the composite ring comprises a conventional parted cast iron sealing ring 26 and a split annular coiled expander-spring 28 disposed internally of ring 26 within the associated piston groove, spring 28 being disposed in an opposing, radially inwardly facing spring-receiving groove or channel 30 in ring 26. Spring 28 is adapted to expand circumferentially, whereby ring 26 is expanded by spring 28 in the circumferential direction into sealing engagement with the opposing wall of cylinder 22 (FIG. 1). The axially outer or sealing face of ring 26 has a pair of outwardly tapering frustoconical side portions 32 and a central cylindrical portion 34 cut by an annular oil-collecting channel 36. A plurality of elongate oil drain vents or ports 38 are arrayed circumferentially about ring channel 36 and connect outer channel 36 with inner ring channel 30. A composite oil ring of the type so far discussed is shown an discussed in greater detail in Hesling U.S. Pat. No. 3,195,903. As generally taught by the above-referenced Carlson application, a parted annular insert rail 40 of wear-resistant or wear-coated metal is disposed between spring 28 and ring 26 to reduce wear on the ring and to prevent embedment or unitization of the ring and spring.

In accordance with the present invention, insert 40 is generally V-shaped in radial cross section, as best seen in FIG. 3, and has a plurality of oil drain vents or ports 42 disposed in circumferential array about the outwardly directed apex 44 thereof. Spaced, inwardly diverging insert sides 45 form a concavity, as viewed in FIG. 3, into which spring 28 is received. Spring 28 is in sliding contact with each side 45 of insert 40 and is spaced thereby from insert apex 44. The included angle between side portions 45 in the assembled condition of insert 40 is determined by such parameters as the axial and radial ring thicknesses, spring cross sectional diameter, etc. A preferred included angle of between 90° and 135° is presently envisioned. Preferably, drain ports 42 are generally aligned with ring drain ports 38, as best seen in FIGS. 2 and 5. In the preferred embodiment of the invention shown in FIGS. 1-6, apex 44 of insert 40 is flattened, such that ports 42 are formed in a generally cylindrical portion of the insert rail.

Insert rail 40 possesses several significant advantages over that disclosed in the above-referenced Carlson application. The V-shaped configuration of the insert makes the insert self-retaining in ring channel 30 in that the radial edges 46 of the insert become embedded in the opposing wall of ring channel 30, as best seen in FIG. 4, so as to resist forces tending to pull the insert out of the ring. Insert 40 may be attached to ring 26 at a subassembly stage to minimize the number of parts handled during final engine assembly. Since ring 26 and insert 40 are attached to each other, the gaps thereof must be aligned, as shown at 48 of FIG. 2, so that the ring/insert combination can expand circumferentially. Yet another important advantage of the invention is that two areas of sliding contact or bearing areas are provided between insert 40 and spring 28, as best seen in FIG. 3, to reduce unit loading between the insert and spring at each point of contact, and to thereby reduce wear and increase the operating life of the composite control ring. Moreover, the V-shaped configuration of the insert rail spaces spring 28 from insert apex 44, and thereby greatly reduces the potential for interference or blockage of aligned oil drain ports 38, 42 by the spring.

An alternative embodiment of the invention is illustrated in FIG. 7 wherein the spring-receiving channel 50 of the ring 52 has a V-shaped channel root 54, as contrasted with the flat or cylindrical root of channel 30 (FIG. 3). An insert rail 56 is formed in a corresponding V-shape and has drain ports 58 located at the radially tapering apex thereof. Although the modification of FIG. 7 is depicted as having insert 56 attached to ring 52 as is preferred, such modification possesses a potential advantage over the preferred embodiment (FIGS. 1-6) in that the insert may be made "free floating" in the ring groove, if desired, by reducing the radial dimension of the insert while retaining a substantial bearing area for sliding contact between the opposing angulated faces of the insert and ring. The embodiment of FIG. 7 is not presently preferred because ring groove 30 (FIG. 3) is less expensive to manufacture, and because truncated apex 44 (FIG. 3) improves venting and coiling characteristics of the insert. It will be recognized, of course, that insert 40 (FIGS. 1-6) may be used with ring 52 (FIG. 7) where desired and will possess all of the above-noted advantages of insert 56.

A second alternative embodiment of the invention is illustrated in FIG. 8 in which a layer 60 of resilient material, such as polyurethane or another synthetic elastomeric compound, is bonded around the radially inner face of each side portion 45a of insert rail 40a. Ring 26 and spring 28 are identical to those discussed hereinabove with reference to FIGS. 1-6. Material layers 60 not only prevent direct metal-to-metal contact between spring 26 and rail 40a, but also allow a small amount of resilient circumferential movement of the spring relative to the insert rail without sliding.

The invention claimed is:

1. A composite oil control ring adapted for use as a seal between the piston and cylinder wall of a reciprocating piston internal combustion engine wherein the piston is provided with a ring groove, comprising a parted sealing ring adapted to be disposed in said piston ring groove for sealing engagement with said cylinder wall, an annular expander-spring disposed in a radially inwardly facing channel in said ring and adapted to circumferentially expand said ring into sealing engagement with said cylinder wall, and a parted annular insert disposed between said sealing ring and said expander-spring, said insert being generally V-shaped in radial cross section having inwardly diverging sides and a radially directed apex adjacent the root of said channel, said spring engaging each side of said V-shaped insert, the expanding force of said spring being transmitted through said insert to said ring.

2. The composite oil control ring set forth in claim 1 wherein said ring includes a first plurality of circumferentially disposed oil vents extending radially therethrough, and wherein said V-shaped insert has a second plurality of oil vents at the radially facing apex of said insert, said expander-spring being spaced from said apex and said second plurality of oil vents by said sides of said insert.

3. The composite oil control ring set forth in claim 2 wherein said insert is attached to said ring internally of said ring channel, and wherein said first and second pluralities of oil vents are in general radial alignment.

4. The composite oil control ring set forth in claim 2 wherein said apex of said V-shaped insert is truncated and substantially cylindrical, said spring being carried in spaced relation to said apex and oil vents by said side portions of said insert.

5. The composite oil control ring set forth in claim 4 wherein the included angle of taper between said side portions of said insert is between 90° and 135°.

6. The composite oil control ring set forth in claim 2 wherein said ring channel has a substantially V-shaped channel root.

7. The composite oil control ring set forth in claim 6 wherein said insert has a pointed apex, said spring being carried in spaced relation to said apex and oil vents by said side portions of said insert.

8. The composite oil control ring set forth in claim 1 wherein radial edges of said insert are embedded in opposing walls of said ring channel such that said insert is affixed to said ring.

9. The composite oil control ring set forth in claim 1 further comprising a layer of elastomeric material bonded on the spring-engaging faces of said insert sides, said spring engaging each said insert side through said material layer.

* * * * *